United States Patent
Cain et al.

(10) Patent No.: US 10,554,976 B2
(45) Date of Patent: Feb. 4, 2020

(54) FRAMEWORK FOR EMBEDDING DATA IN ENCODED VIDEO

(71) Applicant: Synamedia Limited, Middlesex (GB)

(72) Inventors: Harel Cain, Jerusalem (IL); Michal Devir, Haifa (IL); Yaron Sella, Beit Nekofa (IL)

(73) Assignee: Synamedia Limited, Middlesex (GB)

( * ) Notice: Subject to any disclaimer, the term of this patent is extended or adjusted under 35 U.S.C. 154(b) by 491 days.

(21) Appl. No.: 15/218,127

(22) Filed: Jul. 25, 2016

(65) Prior Publication Data

US 2018/0027237 A1 Jan. 25, 2018

(51) Int. Cl.
| | |
|---|---|
| *H04N 19/13* | (2014.01) |
| *H04N 19/11* | (2014.01) |
| *H04N 19/96* | (2014.01) |
| *H04N 19/176* | (2014.01) |
| *H04N 19/467* | (2014.01) |
| *H04N 19/12* | (2014.01) |

(52) U.S. Cl.
CPC ............ *H04N 19/13* (2014.11); *H04N 19/11* (2014.11); *H04N 19/12* (2014.11); *H04N 19/176* (2014.11); *H04N 19/467* (2014.11); *H04N 19/96* (2014.11)

(58) Field of Classification Search
CPC ...... H04N 19/13; H04N 19/176; H04N 19/96; H04N 19/11; H04N 19/12; H04N 19/467
See application file for complete search history.

(56) References Cited

U.S. PATENT DOCUMENTS

| | | | |
|---|---|---|---|
| 8,731,193 B2 | 5/2014 | Farkash et al. | |
| 8,995,711 B2 | 3/2015 | Thorwirth | |
| 9,208,534 B2 | 12/2015 | Cain et al. | |
| 2010/0150394 A1* | 6/2010 | Bloom | G06T 1/0035 382/100 |

(Continued)

OTHER PUBLICATIONS

Author: Dekun Zou and Jeffrey A Bloom. Title: "H.264 Stream Replacement Watermarking With CABAC Encoding." Date: 2010. IEEE International Conference on Multimedia and Expo, p. 117-121 (Year: 2010).*

(Continued)

*Primary Examiner* — Tat C Chio
(74) *Attorney, Agent, or Firm* — Merchant & Gould P.C.

(57) ABSTRACT

In one embodiment of a method, system, and apparatus described herein, an encoded video is received. At least one set of areas of a spatially distinct region of a video frame to be modified is selected. An entropy layer from the spatially distinct region of a video frame. A state of the removed entropy layer and the location of a first area of the set of areas of the spatially distinct region of the video frame is stored. One area of the set of areas is decoded, the decoding occurring recursively until all areas of the set of areas of the spatially distinct region of the video frame for predicting and decoding the one area are decoded. A modification of the decoded one area is performed. The modified decoded one area is re-encoded according to a re-encoding condition. The stored state of the entropy layer is retrieved, and the entropy layer is re-applied at the first area to the spatially distinct region of the video frame which comprises the set of areas. Related methods, systems and apparatus are also described.

19 Claims, 5 Drawing Sheets

(56) References Cited

U.S. PATENT DOCUMENTS

| | | | | |
|---|---|---|---|---|
| 2012/0134417 A1* | 5/2012 | Layachi | ............... | H04N 19/105 |
| | | | | 375/240.16 |
| 2016/0212373 A1* | 7/2016 | Aharon | ................. | H04N 19/17 |
| 2016/0345079 A1* | 11/2016 | Salishev | ............ | H04N 21/8358 |
| 2018/0146197 A1* | 5/2018 | Yi | ........................ | H04N 19/167 |

OTHER PUBLICATIONS

Author: Dekun Zou and Jeffrey A Bloom. Title: "H.264 Stream Replacement Watermarking With CABAC Encoding." Date: 2010. IEEE International Conference on Multimedia and Expo, p. 117-121 (Year: 2010) (Year: 2010).*

Dekun, Zou et al; "H.264 stream replacement watermarking with CABAC encoding," in Muitintedia and Expo (ICME), 2010 IEEE International Conference on Jul. 9-23, 2010, pp. 117-121.

ITU-T-H.264-Telecommunication Standardization Sector of ITU Series H: Audiovisual and Multimedia Systems; Infrastructure of audiovisual services—Coding of moving video—p. 10; Advanced video coding for generic audiovisual services; Feb. 2014.

Tew et al; "An Overview of Information Hiding in H.264/AVC Compressed Video"; in IEEE Trans. on Circuits and Systems for Video Technology, vol. 24 No. 2, Feb. 2014.

Tew, Yiqi et al; "Information hiding in HEVC standard using adaptive coding block size decision," in Image Processing (ICIP), 2014 IEEE International Conference on Oct. 27-30, 2014. pp. 5502-5506.

Wikipedia; "Context-adaptive binary arithmetic coding"; Nov. 9, 2015.

\* cited by examiner

FRAMEWORK FOR EMBEDDING DATA IN ENCODED VIDEO

TECHNICAL FIELD

The present disclosure generally relates to methods and systems for providing a framework enabling embedding data into a video stream.

BACKGROUND

Video watermarks are useful for a variety of purposes in the domain of pay television, such as for allowing a watermark detector to identify the creator of a video, the operator broadcasting the video, or even the identity of the subscriber receiving the video. The latter is known as forensic watermarking.

Embedding forensic watermarks at the video headend has advantages over client-side embedding for computational power and security reasons. Such embedding involves the video headend typically broadcasting multiple versions of sections of the video, each of the versions being visually slightly different from each other.

H.264 and H.265 video encoders typically use the Context-based Adaptive Binary Arithmetic Coding (CABAC) entropy encoding system for the entropy coding layer of macroblock-level syntax elements. CABAC is a highly stateful, very adaptive entropy layer encoding system that can encode similar streams of syntax elements into significantly differing bitstreams because of how CABAC adapts its context models as it processes the input streams. In other words, even if two frames of video differ in just a single syntax element (such as a prediction mode of one macroblock, a coefficient in the residual of a certain macroblock etc.), the resulting post-CABAC bitstream typically completely differs, from the point in which the syntax elements differ until the CABAC engine is reset, according to the video encoding standard.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
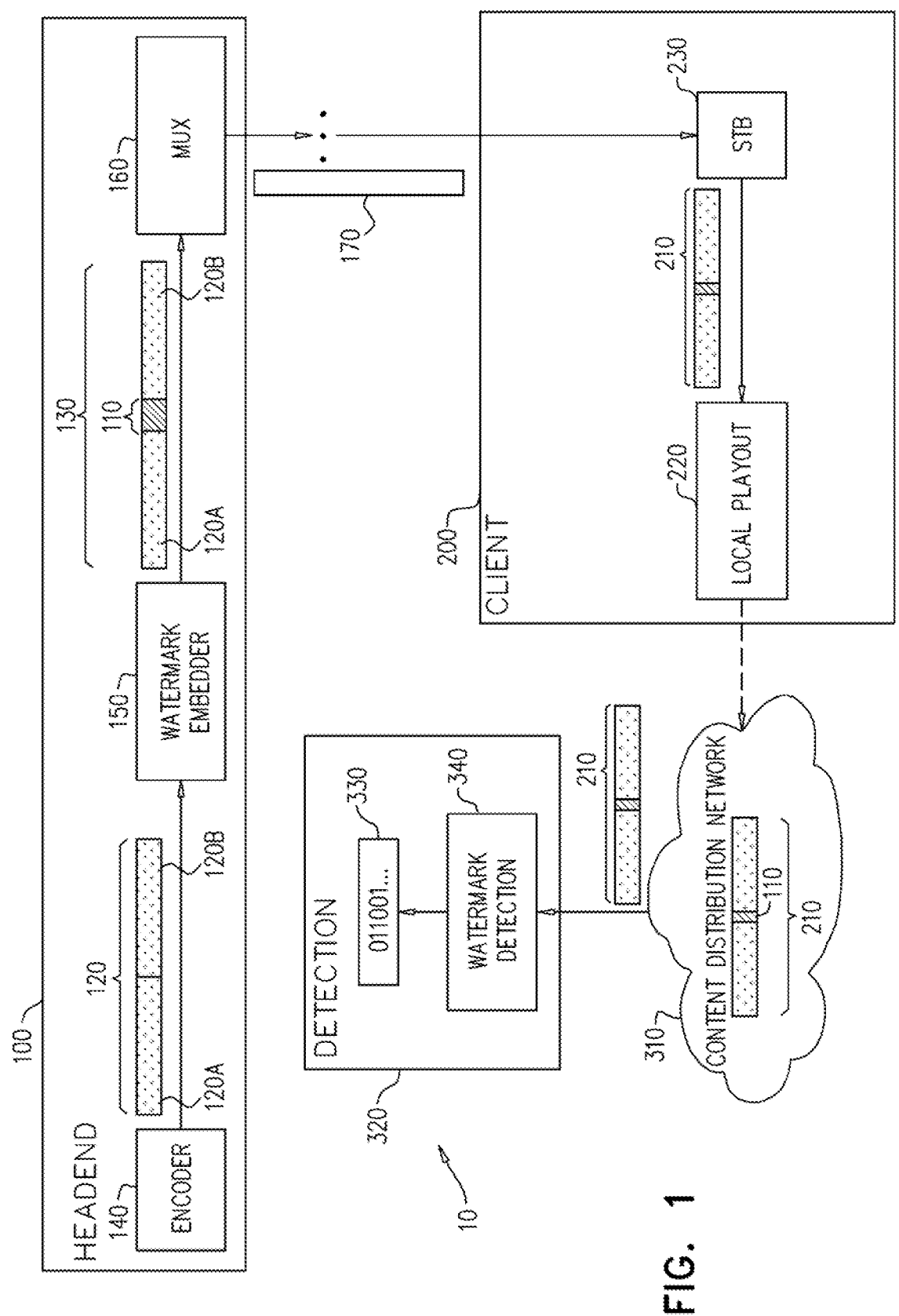
FIG. 1 is a simplified block diagram illustration of a system comprising an watermark embedding sub-system, a client device, and a content distribution network and detection sub-system constructed and operative in accordance with an embodiment of the present invention.

A method, system, and apparatus is described, in one embodiment of which, an encoded video is received. At least one set of areas of a spatially distinct region of a video frame to be modified is selected. An entropy layer from the spatially distinct region of a video frame. A state of the removed entropy layer and the location of a first area of the set of areas of the spatially distinct region of the video frame is stored. One area of the set of areas is decoded, the decoding occurring recursively until all areas of the set of areas of the spatially distinct region of the video frame for predicting and decoding the one area are decoded. A modification of the decoded one area is performed. The modified decoded one area is re-encoded according to a re-encoding condition. The stored state of the entropy layer is retrieved, and the entropy layer is re-applied at the first area to the spatially distinct region of the video frame which comprises the set of areas. Related methods, systems and apparatus are also described.

Notes on Terminology Used Herein

The present description refers to video encoding systems where the Context-based Adaptive Binary Arithmetic Coding (CABAC) entropy encoding system is utilized. Encoding systems utilizing CABAC include, but are not limited to H.264 (sometimes alternatively referred to as either MPEG-4 Part 10 or AVC) and H.265 (sometimes alternatively referred to as High Efficiency Video Coding, HEVC). Other encoding systems which are presently available or which might be used in the future which utilize the CABAC entropy encoding system, or other entropy systems, may also utilize the methods and systems described herein.

Because these various video encoding systems utilize different terms to refer to encoding elements which are substantially equivalent, the following terms will be used throughout. Where a term for a video particular video encoding system is not specifically mentioned below, the term for the equivalent in one of either the H.264 or the H.265 video encoding system will be used herein. Persons of skill in the art will understand where such terms are used, and what term in a given video encoding system is equivalent to the term used herein. In general, and by default, the present specification will use H.264 terminology as a matter of convenience, unless otherwise explicitly noted. Nevertheless, the following generalized usages should be noted:

In general, the term "spatially distinct region of a video frame" may be used in the present specification and claims, and is understood to refer to an H.264 compliant slice in an H.264 compliant video frame, and an H.265 compliant slice segment in an H.265 compliant video frame.

In general, the term "one area of the spatially distinct region of the video frame" may be used in the present specification and claims, and is understood to refer to an H.264 compliant macroblock in an H.264 compliant slice in an H.264 compliant video frame, and an H.265 compliant coding tree block in an H.265 compliant slice segment in an H.265 compliant video frame.

Embedded Versus Encoded Versus Encrypted

The term "embedded" is used throughout the present specification and claims, in all of its grammatical forms, to refer to any type of activity involving placing the watermark, or portions thereof, in the video stream. For example, "embedding the watermark", "embedded bit", "a watermark embedding device", and so forth.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.254 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically apart of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and, claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and or encryption methods for scrambling and or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
encoded, but neither scrambled nor encrypted;
compressed, but neither scrambled nor encrypted;
scrambled or encrypted, but not encoded;
scrambled or encrypted, but not compressed;
encoded, and scrambled or encrypted; or
compressed, and scrambled or encrypted.

Likewise, the terms "decoded" and "decompressed" on the one hand, and the terms "descrambled" and "decrypted" on the other hand, are used to refer to different and exclusive types of processing.

Descriptions of Example Embodiments

Reference is now made to FIG. 1, which is a simplified block diagram illustration of a system 10, comprising an watermark embedding sub-system, typically disposed at a broadcast headend 100, a client device 200, and a content distribution network 310 and detection sub-system 320 constructed and operative in accordance with an embodiment of the present invention. The various sub-systems 100, 200, 310, 320 of the system 10 of FIG. 1 are now described, it is appreciated that the various sub-systems themselves mentioned above may be described herein as "systems", rather than "sub-systems", particularly in that some of the sub-systems of FIG. 1, are implemented, or may be implemented, in and of themselves, as independent systems.

The broadcast headend 100 is operative to insert a video watermark 110 into an encoded video stream 120, as will be explained below.

The client device 200 is operative to decode watermarked video 130, produced by the headend 100, producing decoded watermarked video 210, which may optionally be displayed by a local playout system 220. After the decoded watermarked video 210 is decoded, the video may then be captured and made available to a content distribution network 310.

Captured decoded watermarked video 210 may be made available for further download in the content distribution network 310, not necessarily in a legal fashion. The video stream 210 may then be downloaded and input to a detection system 320 in order to use the watermark 110 which was embedded at the broadcast headend 100 by a watermark embedder 150 in order to determine an identity of a device, such as client device 200, from which the decoded watermarked video 210 was captured and uploaded to the content distribution network 310. The client device may comprise any appropriate video client, such as a set top box (STB) 230 or any other appropriate video client which performs the same or similar function as the STB 230, for example, and without limiting the generality of the foregoing, a personal video recorder (PVR); a handheld computing device, a desktop computing device, and so forth. The STB 230, as is known in the art, demultiplexes, decrypts, and decodes the encrypted multiplexed watermarked encoded video stream 170 and produces the watermarked decoded video stream 210.

It is appreciated that various systems are known in the art for embedding and for detection of watermarks. By way of a no example, U.S. Pat. No. 9,208,534 of Cain, et al. and as yet unpublished U.S. patent application Ser. No. 14/790,028, also of Cain, et al. describes such systems.

An encoded video stream, as is known in the art, comprises video which has been encoded according to one of the H.264 video encoding standard or H.265 video encoding standard, or other appropriate video encoding scheme.

As was mentioned above, H.264 and H.265 video encoders, such as video encoder 140 typically use the CABAC entropy encoding system for the entropy coding layer of macroblock-level syntax elements. Due to the stateful nature of CABAC it is challenging to embed a watermark into the video stream as long as the CABAC engine is not reset (which does not typically happen during decoding of a slice, the slice typically comprising a whole picture). Additionally, the ability of the headend to make at least two versions of the video differing in their coding elements which converge back to the same bitstream before the CABAC engine is reset is also challenging.

Accordingly, in order to overcome limitations resulting from CABAC and enable multiple video versions that overlap in the vast majority of their encoded representations, the H.264 compliant slices or H.265 compliant slice segments are used as input slices in order to produce additional output-slices that are constructed such that the additional output-slices are rendered in lieu of existing slices (i.e. input slices) by the client device 200. This process, as will be explained in greater detail below, is performed in the watermark embedder 150. It is appreciated that the term "output-slice" is meant to refer to a slice which typically comprises a smaller number of macroblocks than a typical slice. It is also appreciated that output-slices need not be the same size. Some output-slices may be smaller than others, by way of example. By way of example, in typical H.264 or H.265 video frames, the slice (in the H.264 video frame, or the slice segment in the H.265 video frame) typically may comprise the entire video frame. The same video frame may comprise a plurality of output-slices, as will be described herein below.

Macroblocks of the output-slice may be modified in the uncompressed domain using methods known in the art and then re-encoded in the output-slice.

At display time the client device 200 is able to produce a decoded watermarked video, such as watermarked video stream 210. It is appreciated that the watermarked video stream 210 may be produced on an individualized per client device 200 basis, as is known in the art. Details of the producing the frames into which the watermarks are embedded are now provided, with reference to FIGS. 2 and 3.

Figure 2:
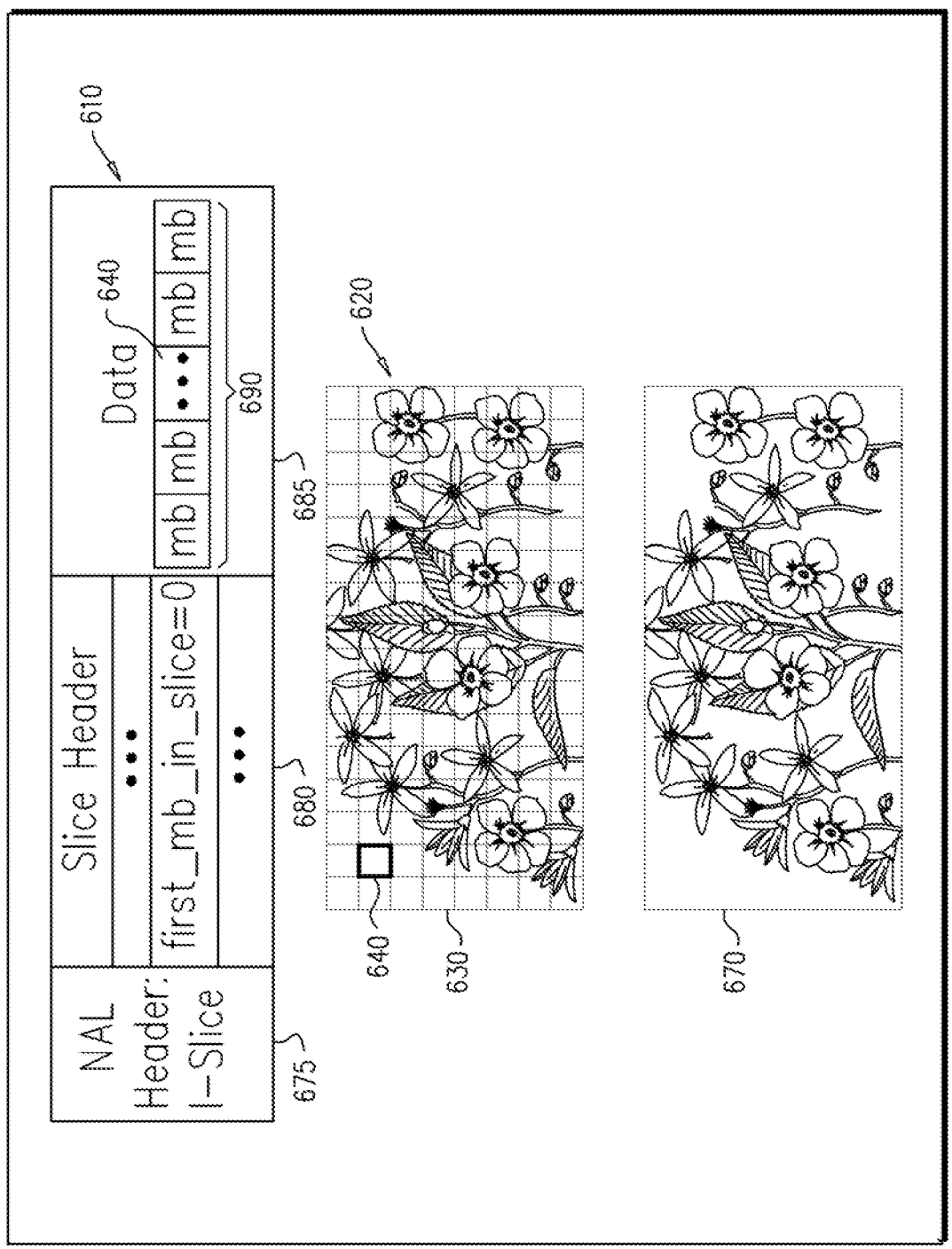
FIG. 2 is a partially block diagram, partially pictorial illustration of an H.264 video frame prior to having a watermark embedded by the watermark embedding subsystem of FIG. 1.
Figure 3:
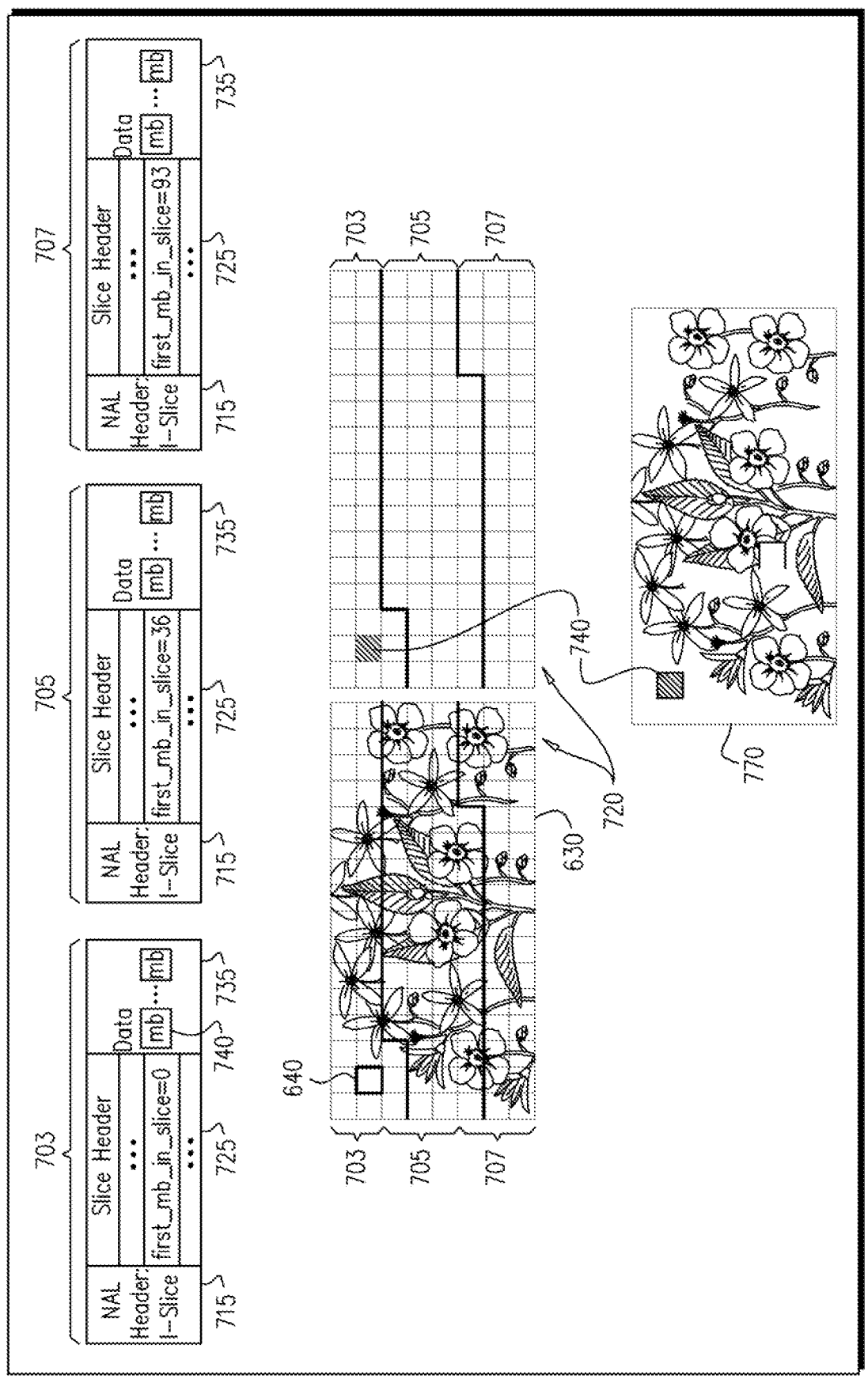
FIG. 3 is a partially block diagram, partially pictorial illustration of the video frame of FIG. 2 after having the watermark embedded by the watermark embedding subsystem of FIG. 1.

Reference is now made to FIG. 2, which is a partially block diagram, partially pictorial illustration of an H.264 video frame prior to having a watermark embedded by the watermark embedder 150 of FIG. 1. FIG. 2 is intended to serve as the "before" picture contrasting with the "after" picture, FIG. 3. The "before" and "after" states referred to here, are before and after embedding by the watermark embedder 150 of FIG. 1. It is appreciated that the description of FIGS. 2 and 3 is in terms of H.264. However, those skilled in the art will appreciate that equivalent H.265 or other, video encoding terminology may be applied to the discussion of H.264 below.

Turning now to the specific details of FIG. 2, only those portions of the H.264 coding which are relevant for the present discussion are depicted in FIG. 2 (and, mutatis mutandis, FIG. 3).

FIG. 2 depicts a single video frame of an H.264 video image. As is known in the art, an encoded video image, such as the single video frame depicted in FIG. 2, comprises a stream of syntactic elements 610 compressed into a stream of bits by the CABAC entropy layer. The series of syntactic elements 610 depicted include various fields which are comprised in the actual H.264 encoding. FIG. 2 also depicts an image 620, with a grid 630 superimposed over the image 620. The grid 630, which does not appear in the actual image—neither as encoded nor as displayed when decoded—is shown in the figure to depict how the image 620 is encoded as a series of macroblocks (each block in the grid 630 may be viewed, for example, as a macroblock) such as macroblock 640. Finally, a depiction of a decoded image 670, which depicts how the image would appear, for example, when the image 620 is displayed by the local playout system 220 (FIG. 1), when the STB 230 (FIG. 1) displays the encoded image 620 (without the grid) by decoding the H.264 encoding of the data elements 610.

Turning to the specific details of the data elements 610 of the H.264 image, the data elements 610 comprise a NAL (network abstraction layer) header 675. As is known in the art, H.264 coded video data is organized into NAL units, each unit containing an integer number of bytes. The H.264 NAL unit has a header byte, such as NAL header 675, which contains an indication of the type of data in the NAL unit. For example, in FIG. 2 the NAL header 675 indicates that the encoded image 620 comprises an I-Slice. It is appreciated that some NAL units comprise a slice and other NAL units do not comprise a slice, but rather comprise other data, for example, picture parameter settings, as is described in the H.264 specification.

The NAL header 675, for NAL units comprising a slice, is followed by a Slice Header 680. The Slice Header 680 comprises a "first_mb_in_slice" field. It is appreciated that although the Slice Header 680 comprises other fields as well, in the interest of brevity, however, only the first_mb_in_slice field is depicted. The first_mb_in_slice field indicates an address of the first macroblock in the series of syntactic elements 610. The Slice Header 680 is followed by data 685 in the video slice, which is depicted as comprising a plurality of macroblocks 690, including encoded macroblock 640. Macroblocks and macroblock addresses are defined in sections 3.75, 3.77 and 3.80 of the H.264 specification.

Reference is now made to FIG. 3, is a partially block diagram partially pictorial illustration of the H.264 video frame of FIG. 2 after having the watermark embedded by the watermark embedder 150 of FIG. 1. Instead of the details of the H.264 video frame prior to watermarked, found in FIG. 2, a new, "output-slice" 703 is shown comprised in the H.264 video frame. Similarly to FIG. 2, the H.264 video frames are depicted as a stream of bits as a series of data elements showing H.264 slices and detailing various fields which are comprised in the actual H.264 encoding of the H.264 video frames, depicted in FIG. 3. FIG. 3 also depicts H.264 encoded images 720, where each encoded image shows a grid superimposed on the image. As in FIG. 2, it is noted that the grid does not appear in the actual image, and is intended to depict how each image is encoded as a series of macroblocks. Finally FIG. 3 shows a depiction of H.264 decoded image 770, depicting how, when the STB 230 (FIG. 1) displays the encoded images by decoding the H.264 series of data elements, the image would appear, for example, when the image is displayed by the local playout system 220 (FIG. 1).

The output-slice 703 has a NAL header 715 indicating that the slice comprises an I-slice. The output-slice 703 also has a slice header 725. The slice header 725 of the output-slice 703 comprises H.264 fields, such as a first_mb_in_slice field set equal to 0. The data portion of the output-slice 703 comprises macroblocks 740, one of which corresponds, by way of example, to macroblock 740 as depicted in the second row in the encoded image 720. Similarly, output-slices 705 and 707 are depicted in FIG. 3. Output-slices 705 and 707 are encoded similarly to output-slice 703, and, except to note that the first_mb_in_slice field of macroblock 705 is set to 36, and the first_mb_in_slice field of macroblock 707 is set to 93, no additional discussion of output-slices 705 and 703 is required.

When the encoded image 720 is decoded by the STB 230 of FIG. 1, the decoded image 770 is depicted as comprising the macroblock 740 of the output-slice 703. Accordingly, decoded frame 770 appears with the macroblock 740 embedded in the image in the decoded frame 770. Decoded frame 770 appears with the macroblock 740 embedded in the image in the decoded frame 770 because the single macroblock in the data 735 of the output-slice 703 is placed, by an H.264 decoder comprised in the STB 230 of FIG. 1 at position 0, as will be appreciated by those of skill in the art.

As was noted above, the discussion of FIGS. 2 and 3 centered around H.264. It is appreciated that discussions of H.264 slices are relevant to H.265 slice segments, and more generally, to spatially distinct regions of the video frame. Similarly H.264 discussions of macroblocks are relevant to H.265 coding tree blocks, and more generally, to particular segments of the spatially distinct regions of the video frame.

Likewise, references to the H.264 first_mb_in_slice field relevant to the H.265 slice_segment_address field.

Implementation details for producing output-slices (such as output-slices 703, 705, 707) from input-slices, such as the I-slice indicated in the NAL header 675 (FIG. 2) will now be described.

Figure 4:
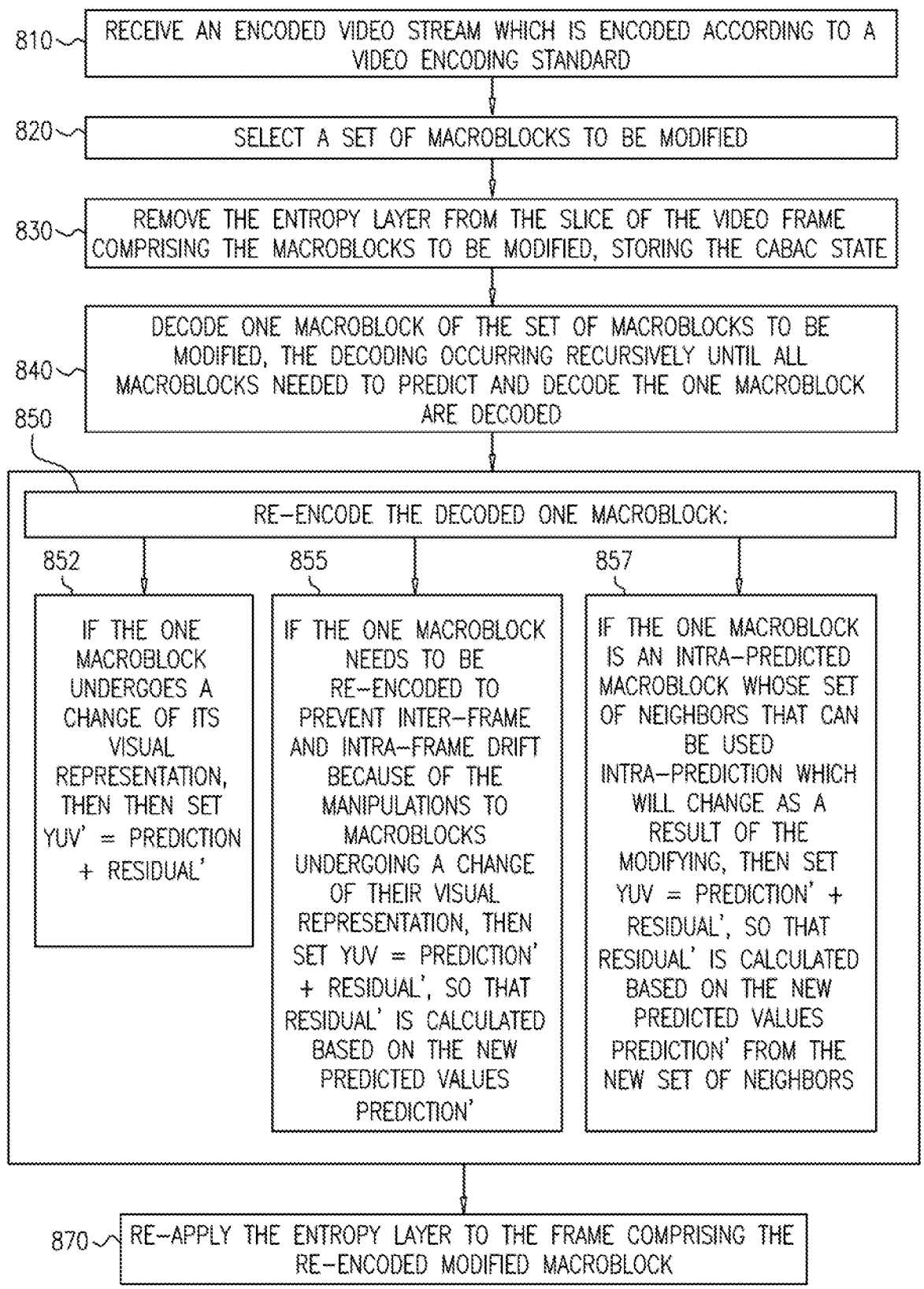
FIG. 4 is a simplified flowchart diagram of a method for producing output-slices for, and watermark embedding in, the system of FIG. 1.

Reference is now made to FIG. 4, which is a simplified flowchart diagram of a method for producing output-slices, such as, by way of a non-limiting example, output slices 703, 705, and 707 of FIG. 3, and for watermark embedding in the system of FIG. 1. Other modifications may be introduced to the output-slices 703, 705, and 707 of FIG. 3, as will be mentioned below. FIG. 4 details the method used to modify any of I-slices, P-slices, or B-slices. Embodiments described herein provide for efficient minimal re-encoding for manipulation of encoded videos. Said manipulation of encoded videos may be performed for a number of reasons, at least two of which are not mutually exclusive:

changing or modifying of the encoded video; and
re-slicing existing slices into smaller slices such that multiple (typically, watermarked) versions of video can be broadcast.

In the case of re-slicing, the re-slicing is done such that the input-slice is cut into output-slices, such that each area of the video frame modified by the watermark is contained in a single, minimal-size output-slice. Thus only output-slices that contain watermarks need to be produced in more than a single version, and so the original video stream and the watermarked video stream share the vast majority of their encoded representation.

Changing or modifying the encoded video may include, but not be limited to addition of a watermark (overt or covert), addition of a logo, blurring of certain screen regions, and so forth.

An encoded video stream, such as encoded video stream 120 (FIG. 1) is received at the watermark embedder 150 of FIG. 1. The encoded video stream 120 (FIG. 1) is encoded according to a video encoding standard, such as H.264 or H.265, as was noted above (step 810).

Every slice which is to be manipulated undergoes the following steps:

A set of macroblocks to be modified in the slice which is to be manipulated are selected (step 820). Thus, selection would occur, at least, in macroblocks in which of a watermark (overt or covert) or a logo is to be added, or where certain screen regions are to be blurred, or where an output slice (such as output slice 703 of FIG. 3) is to be generated, and so forth.

The state of the CABAC entropy layer of the slice to be manipulated is removed and is stored in a memory by the watermark embedder 150 of FIG. 1, noting its position as the position of a first one of the set of macroblocks to be modified (step 830).

One macroblock of the set of macroblocks to be modified is decoded, the decoding occurring recursively until all macroblocks needed to predict and decode the one macroblock of the set of macroblocks are decoded (step 840).

Changes and modifications to be made to the decoded one macroblock of the set of macroblocks are introduced into the one macroblock of the set of macroblocks. Once the changes and modifications are introduced into the decoded one macroblock of the set of macroblocks, the decoded one macroblock of the set of macroblocks is re-encoded (step 850).

The re-encoding of the decoded one macroblock of the set of macroblocks is performed in one of three ways, described below are three re-encoding conditions. Prior to that explanation, it is noted that original pixel values of the macroblock in the uncompressed domain can be written as YUV=Prediction+Residual, where Prediction are the predicted values (whether from inter- or intra-prediction) and Residual is the contribution of the transform coefficients for this macroblock (known in the standard as residuals). Let the new values, post modification, be denoted by YUV', and the new prediction values be denoted by Prediction' and the new residual values be denoted by Residuals. Thus:

A first re-encoding condition is the one macroblock undergoes a change of its visual representation, then determine new values for YUV, such that YUV'=Prediction+Residual' (step 852). Note that the Prediction values remain unchanged, and only new residuals have to be calculated.

A second re-encoding condition is the one macroblock requires re-encoding to prevent inter-frame and intra-frame drift because of the manipulations to macroblocks undergoing a change of their visual representation, then set YUV=Prediction'+Residual', so that Residual' is calculated based on the new predicted values Prediction' (step 855); and A third re-encoding condition is the one macroblock is an intra-predicted macroblock whose set of neighbors that can be used for intra-prediction and will change as a result of the modifying, then set YUV=Prediction'+Residual', so that Residual' is calculated based on the new predicted values Prediction' from the new set of neighbors (step 857).

The stored CABAC entropy layer is then reapplied at the point where it was stored during step 830. That is to say, the CABAC entropy layer is restored at the location of the first one of the set of macroblocks to be modified (step 870).

Figure 5:
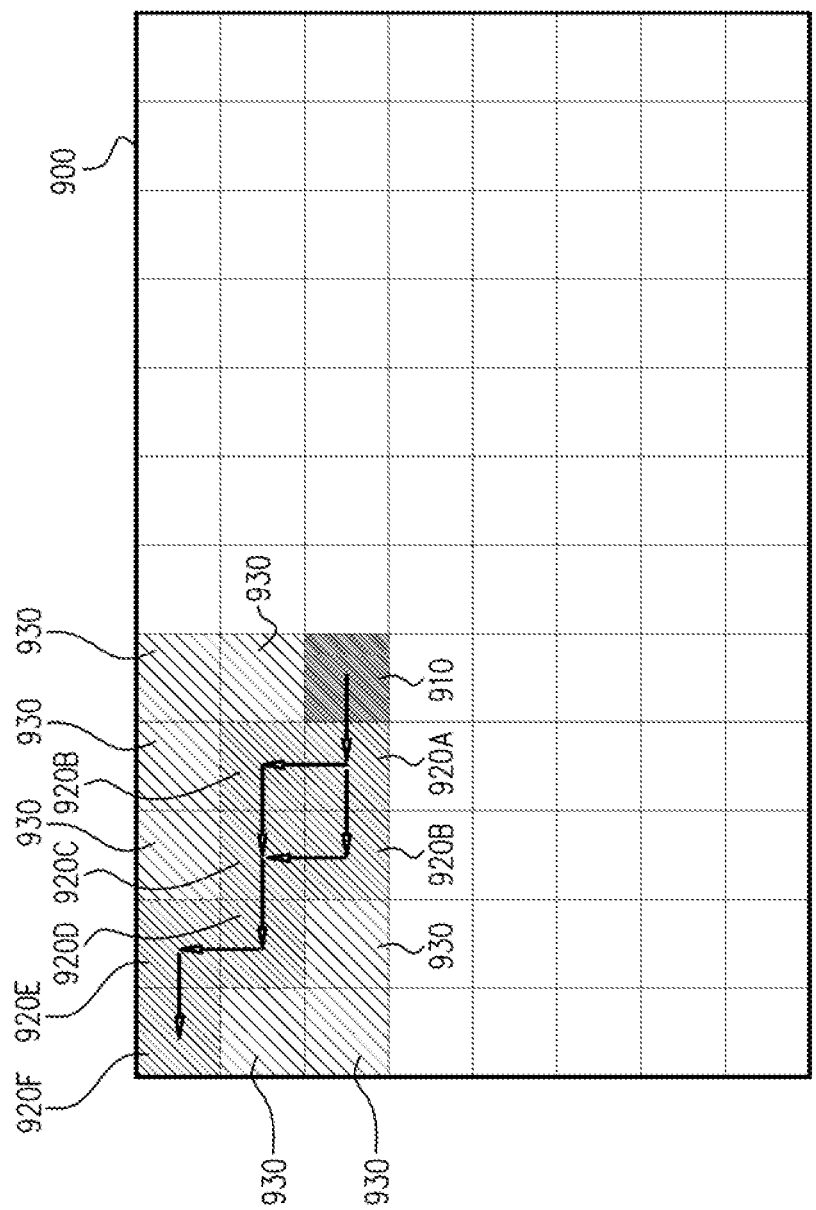
FIG. 5 is a depiction of an exemplary video frame, showing exemplary macroblocks to be decoded, for use in a discussion of implementation of the watermark of FIG. 1.

Reference is now made to FIG. 5 which is a depiction of an exemplary video frame 900, showing exemplary macroblocks to be decoded, for use in a discussion of implementation of the watermark of FIG. 1. The exemplary video frame 900 in FIG. 5 has a first exemplary macroblock 910 which, for the purposes of the present discussion, has been modified, for example, in one of the ways mentioned above. Alternatively, the exemplary video frame 900 may need to be decoded to be modified to generate an output slice (such as output slice 703). In any of these cases, and other similar cases, decoding may be needed. As was noted above, decoding is predicated on recursively decoding of all macroblocks needed to predict and decode the exemplary macroblock 910 (as in step 840 above).

Accordingly, in order to decode the exemplary macroblock 910, a first group of macroblocks 920A-F need to be decoded. Additionally, a second set of macroblocks 930 may also be required in order re-encode the first set of macroblocks 920. The arrows indicated in FIG. 5, flowing from exemplary macroblock 910 and through the first set of macroblocks 920A-F indicate which macroblock is predicted from which previous one of the first set of macroblocks 920A-F. So, exemplary macroblock is predicted from macroblock 920A. Macroblock 920A is predicted from macroblocks 920B. Macroblocks 920B are predicted, at least, from macroblock 920C. Macroblock 920C is predicted, at least, from macroblock 920D. Macroblock 920D is predicted, at least, from macroblock 920E. Macroblock 920E is predicted, at least, from macroblock 920F.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   receiving an encoded video stream;
   selecting a set of areas of a spatially distinct region of a video frame to be modified;
   removing an entropy layer from the spatially distinct region of a video frame;
   storing a state of the removed entropy layer and the location of a first area of the set of areas of the spatially distinct region of the video frame;
   decoding one area of the set of areas of the spatially distinct region of the video frame, the decoding occurring recursively until all areas of the set of areas of the spatially distinct region of the video frame for predicting, and decoding the one area are decoded;
   performing a modification of the decoded one area, wherein performing the modification of the decoded one area comprises re-slicing the spatially distinct region of the video frame, the re-sliced spatially distinct region of the video frame comprising the one area of the set of areas of the spatially distinct region of the video frame, and wherein re-slicing the spatially distinct region of the video frame comprises re-slicing existing slices into a plurality of smaller slices, each of the plurality of smaller slices comprising the one area of the set of areas of the spatially distinct region of the video frame modified by a watermark;
   re-encoding the modified decoded one area according to a re-encoding condition;
   retrieving the stored state of the removed entropy layer; and
   re-applying the entropy layer at the stored location of the first area to the spatially distinct region of the video frame which comprises the set of areas.

2. The method according to claim 1 wherein the received encoded video stream is encoded according to the H.264 encoding video standard.

3. The method according to claim 2 wherein the spatially distinct regions of the video frame are H.264 compliant slices.

4. The method according to claim 2 wherein the one area of the spatially distinct regions of the video frame is an H.264 compliant macroblock.

5. The method according to claim 1 wherein the received encoded video stream is encoded according to the H.265 encoding standard.

6. The method according to claim 5 wherein the spatially distinct regions of the video frame are H.265 compliant slices areas.

7. The method according to claim 5 wherein the one area of the spatially distinct regions of the video frame is an H.265 compliant coding tree block.

8. The method according to claim 1, wherein the re-encoding condition comprises the modified decoded one area undergoing a change of its visual representation, wherein new YUV values of the modified decoded one area are re-encoded to be Prediction values plus new Residual values.

9. The method according to claim 1, wherein the re-encoding condition comprises the modified decoded one area undergoing re-encoding in order to prevent inter-frame and intra-frame drift due to manipulations of others of the set of areas undergoing a change of their visual representation, wherein YUV values of the modified decoded one area are re-encoded to be new Prediction values plus new Residual values, so that the new Residual values are calculated based on new predicted Prediction values.

10. The method according to claim 1, wherein the re-encoding condition comprises the modified decoded one area being an intra-predicted one area whose set of neighbors are suitable for use for intra-prediction which will change as a result of the modifying, wherein the YUV values of the modified decoded one area are re-encoded to be new Prediction values plus new Residual values, so that the new Residual values are calculated based on new Prediction values from the set of neighbors.

11. The method according to claim 1 wherein the modification of the decoded one area of the spatially distinct region of the video frame comprises modifying at least one pixel in one of a Y, a U, or a V domain.

12. The method according to claim 1 wherein the modification of the decoded one area of the spatially distinct region of the video frame comprises embedding the watermark into the one area.

13. The method according to claim 1 wherein the modification of the decoded one area of the spatially distinct region of the video frame comprises embedding a logo into the one area.

14. The method according to claim 1 wherein the modification of the decoded one area of the spatially distinct region of the video frame comprises blurring a region of the one area.

15. A system comprising:
   a receiver operative to receive an encoded video stream;
   a video modifier operative to select a set of areas of a spatially distinct region of a video frame to be modified;
   the video modifier further operative to remove an entropy layer from the spatially distinct region of a video frame which comprises the at least one set of areas;
   the video modifier further operative to store, in a storage unit, a state of the removed entropy layer and the location of a first area of the set of areas of the spatially distinct region of the video frame;
   a video decoder operative to decode one area of the spatially distinct region of the video frame, the decoding occurring recursively until all areas of the set of areas of the spatially distinct region of the video frame for predicting and decoding the one area are decoded;
   the video modifier operative to modify the decoded one area, wherein the video modifier operative to modify the decoded one area comprises the video modifier operative to re-slice the spatially distinct region of the video frame, the re-sliced spatially distinct region of the video frame comprising the one area of the set of areas of the spatially distinct region of the video frame, and wherein the video modifier operative to re-slice the spatially distinct region of the video frame comprises the video modifier operative to re-slice existing slices into a plurality of smaller slices, each of the plurality of smaller slices comprising the one area of the set of areas of the spatially distinct region of the video frame modified by a watermark;

a video encoder operative to re-encode the modified decoded one area according tea a re-encoding condition;

the video modifier operative to retrieve the stored state of the removed entropy layer from the storage unit; and the video modifier operative to re-apply the entropy layer at the stored location of the first area to the spatially distinct region of, the video frame which comprises the set of areas.

16. The system according to claim 15 wherein the received encoded video stream is encoded according to the H.264 encoding video standard.

17. The system according to claim 15 wherein the received encoded video stream is encoded according to the H.265 encoding video standard.

18. The system according to claim 15, wherein the re-coding condition comprises one of the following:

the modified decoded one area undergoing a change of its visual representation, wherein new YUV values of the one area of the spatially distinct region of the video frame are re-encoded to be Prediction values plus new Residual values;

the modified decoded one area undergoing re-encoding in order to prevent inter-frame and intra-frame drift due to manipulations of others of the set of areas undergoing a change of their visual representation, wherein YUV values of the one area are re-encoded to be new Prediction values plus new Residual values, so that the new Residual values are calculated based on new predicted Prediction values; and the modified decoded one area being an intra-predicted one area whose set of neighbors are suitable for use for intra-prediction which will change as a result of the modifying, wherein the YUV values of the one area are re-encoded to be new Prediction values plus new Residual values, so that the new Residual values are calculated based on new Prediction values from the set of neighbors.

19. The system according to claim 15 wherein the modification of the decoded one area comprises at least one of the following:

modifying at least one pixel in one of a Y, a U, or a V domain;

embedding the watermark into the one area;

embedding a logo into one area;

blurring a region of the one area; and re-slicing the spatially distinct region of the video frame, the re-sliced spatially distinct region of the video frame comprising the one area of the set of areas of the spatially distinct region of the video frame.

* * * * *